United States Patent
Takahashi et al.

(10) Patent No.: US 9,138,674 B2
(45) Date of Patent: Sep. 22, 2015

(54) HONEYCOMB STRUCTURE

(71) Applicant: NGK INSULATORS, LTD., Nagoya (JP)

(72) Inventors: Nobuaki Takahashi, Nagoya (JP); Suguru Kodama, Nagoya (JP); Yasushi Uchida, Nagoya (JP); Masahiro Shirai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 148 days.

(21) Appl. No.: 13/848,313

(22) Filed: Mar. 21, 2013

(65) Prior Publication Data
US 2013/0255212 A1  Oct. 3, 2013

(30) Foreign Application Priority Data

Mar. 28, 2012 (JP) .................. 2012-072862

(51) Int. Cl.
*B01D 39/06* (2006.01)
*B01D 39/14* (2006.01)
(Continued)

(52) U.S. Cl.
CPC ............ *B01D 46/2448* (2013.01); *C04B 28/24* (2013.01); *C04B 35/111* (2013.01); *C04B 35/195* (2013.01); *C04B 35/486* (2013.01); *C04B 35/505* (2013.01); *C04B 35/565* (2013.01); *C04B 37/005* (2013.01); *C04B 38/0006* (2013.01); *C04B 38/0019* (2013.01);
(Continued)

(58) Field of Classification Search
CPC .............. F01N 2450/28; F01N 3/0222; F01N 2330/06; F01N 3/022; B01D 2046/2496; B01D 46/2418; B01D 46/2448; C04B 35/565
See application file for complete search history.

(56) References Cited

U.S. PATENT DOCUMENTS 5,914,187 A * 6/1999 Naruse et al. ............... 428/327
2002/0197193 A1  12/2002 Harada et al.
(Continued)

FOREIGN PATENT DOCUMENTS

EP  0 816 065  1/1998
EP  1 780 187  5/2007
(Continued)

OTHER PUBLICATIONS

Voseipka et al. U.S. Appl. No. 61/510,811, Process for Producing Cemented and Skinned Acicular Mullite Honeycomb Structure, Specification, Jul. 22, 2011.*
(Continued)

*Primary Examiner* — Amber Orlando
(74) *Attorney, Agent, or Firm* — Burr & Brown, PLLC

(57) ABSTRACT

In the present invention, a honeycomb structure includes a joined honeycomb segment body in which a plurality of honeycomb segments are integrally joined by mutual joining surfaces via a joining material layer, and has a configuration in which a plurality of cells to become through channels of a fluid are arranged in parallel with one another along a central axis direction. The joining material layer contains, as aggregates, inorganic particles, and acicular crystal particles having a shot content ratio smaller than 10 mass %, and the acicular crystal particles include 80 mass % or more of acicular crystal particles having an average length of 20 to 500 μm in a long axis direction of the acicular crystal particles. As the inorganic particles, silicon carbide, cordierite, alumina, zirconia, yttria or the like can be used, and as natural acicular minerals, sepiolite, wollastonite, palygorskite or the like can be used.

11 Claims, 2 Drawing Sheets

(51) Int. Cl.

| | | |
|---|---|---|
| *B01D 39/20* | (2006.01) | |
| *B01D 46/24* | (2006.01) | |
| *C04B 28/24* | (2006.01) | |
| *C04B 35/111* | (2006.01) | |
| *C04B 35/195* | (2006.01) | |
| *C04B 35/486* | (2006.01) | |
| *C04B 35/505* | (2006.01) | |
| *C04B 35/565* | (2006.01) | |
| *C04B 37/00* | (2006.01) | |
| *C04B 38/00* | (2006.01) | |

(52) U.S. Cl.
CPC . *C04B 2235/3217* (2013.01); *C04B 2235/3225* (2013.01); *C04B 2235/3244* (2013.01); *C04B 2235/3481* (2013.01); *C04B 2235/3826* (2013.01); *C04B 2235/526* (2013.01); *C04B 2235/5228* (2013.01); *C04B 2235/5232* (2013.01); *C04B 2235/5436* (2013.01)

(56) References Cited

U.S. PATENT DOCUMENTS

| | | |
|---|---|---|
| 2005/0272602 A1 | 12/2005 | Ninomiya |
| 2006/0216466 A1 | 9/2006 | Yoshida |
| 2006/0240212 A1 | 10/2006 | Masukawa et al. |
| 2009/0004431 A1 | 1/2009 | Ninomiya |
| 2009/0029104 A1 | 1/2009 | Iwata et al. |
| 2009/0202779 A1 | 8/2009 | Yoshida |
| 2010/0024368 A1 | 2/2010 | Briot et al. |
| 2011/0250094 A1* | 10/2011 | Ido et al. .................. 422/168 |
| 2011/0250095 A1* | 10/2011 | Ido et al. .................. 422/168 |
| 2011/0256379 A1 | 10/2011 | Champagne et al. |
| 2011/0304084 A1* | 12/2011 | Ohno et al. ................ 264/630 |

FOREIGN PATENT DOCUMENTS

| | | |
|---|---|---|
| FR | 2 902 424 | 12/2007 |
| JP | 2002-085922 | 3/2002 |
| JP | 2002-273137 | 9/2002 |
| JP | 2004-261623 | 9/2004 |
| JP | 3889194 B2 | 3/2007 |
| JP | 2008-007683 A1 | 1/2008 |
| JP | 4392984 B2 | 1/2010 |
| JP | 4592695 B2 | 12/2010 |
| WO | 2006/103786 A1 | 10/2006 |
| WO | 2007/111280 A1 | 10/2007 |
| WO | 2010/049909 | 5/2010 |
| WO | 2013/015932 A1 | 1/2013 |

OTHER PUBLICATIONS

Extended European Search Report, European Patent Application No. 13160980.2, dated Sep. 17, 2013 (5 pages).

European Office Action, European Application No. 13160980, dated Aug. 15, 2014 (4 pages).

\* cited by examiner

HONEYCOMB STRUCTURE

The present application is an application based on JP-2012-072862 filed on Mar. 28, 2012 with the Japanese Patent Office, the entire contents of which are incorporated herein by reference.

BACKGROUND OF THE INVENTION

1. Field of the Invention

The present invention relates to a honeycomb structure in which a plurality of honeycomb segments are integrally joined by a joining material, and more particularly, it relates to a honeycomb structure having a joining material layer in which a stress relaxing function and a joining strength are equal to or higher than those of a joining material layer of a conventional honeycomb structure, and having an excellent resistance to heat shock.

2. Description of Related Art

A honeycomb structure is broadly used as a collecting filter of a microscopic particulate matter, for example, as a diesel particulate filter (DPF) to collect and remove particulates included in an exhaust gas from a diesel engine or the like.

Such a honeycomb structure has, for example, a configuration in which a plurality of cells divided and formed by porous partition walls made of silicon carbide (SiC) or the like to become through channels of a fluid are arranged in parallel with one another in a central axis direction. Moreover, ends of the adjacent cells are alternately plugged (in a checkered pattern-like manner). That is, one end of one cell is open, and the other end of the one cell is plugged. Moreover, one end of the other cell adjacent to the one cell is plugged, and the other end of the other cell is open. A plurality of configurations in which such cells are arranged in parallel with one another in the central axis direction (hereinafter referred to as "the honeycomb segments") are integrally joined to one another by a joining material to form the honeycomb structure.

According to such a structure, the exhaust gas can be purified as follows. First, the exhaust gas is allowed to flow into a predetermined cell (the inflow cell) through one end of the honeycomb structure. In this case, the other end of this cell is plugged, and hence the exhaust gas passes through a porous partition wall and is introduced into the adjacent cell (the outflow cell). Moreover, when the exhaust gas passes through the partition walls, the particulates in the exhaust gas are collected by the partition walls. Therefore, the exhaust gas purified through the outflow cells adjacent to the inflow cells is discharged.

To use such a honeycomb structure (the filter) continuously for a long period of time, the filter needs to be periodically subjected to a regeneration treatment. That is, when a pressure loss increased by the particulates deposited in the filter with an elapse of time is decreased to return a filter performance to an initial state, it is necessary to burn and remove the particulates deposited in the filter. At this filter regeneration, a large heat stress is generated by heating, thereby resulting in the problem that this heat stress causes defects such as cracks or damages in the honeycomb structure.

Therefore, to meet a request for enhancement of a resistance to a heat shock such as this heat stress, there is suggested a honeycomb structure of a divided structure in which a plurality of honeycomb segments are integrally joined via a joining material layer to impart a function of distributing and relaxing the heat stress (e.g., see Patent Documents 1 to 4). Moreover, according to such a honeycomb structure, the resistance to the heat shock can be improved to a certain degree.

Furthermore, in the honeycomb structure in which the plurality of honeycomb segments are joined by the joining material, it is suggested that a porosity distribution of this joining material layer portion is controlled to a suitable value, to impart the function of distributing and relaxing the heat stress, thereby obtaining the honeycomb structure having an excellent resistance to heat shock (see Patent Document 5). In this method, the joining material layer contains inorganic fibers, but the inorganic fibers include a grain-like inorganic substance called a shot which is a byproduct during manufacturing of the inorganic fibers. Due to the presence of this shot, the stress relaxing function and a joining strength deteriorate.

Moreover, to join the honeycomb segments, an SiC joining material is suggested in which in addition to SiC particles, acicular crystal particles or strip-like crystal particles made of an inorganic material are contained to enhance dispersibility and the joining strength (see Patent Document 6). However, in this method, the joining material layer becomes dense and has an increased Young's modulus, and hence there is the problem that the stress relaxing function against thermal expansion of the honeycomb segments deteriorates.

[Patent Document 1] JP-B-4392984
[Patent Document 2] JP-B-3889194
[Patent Document 3] JP-B-4592695
[Patent Document 4] WO 2006/103786
[Patent Document 5] WO 2007/111280
[Patent Document 6] JP-A-2008-7683

SUMMARY OF THE INVENTION

However, in recent years, a demand for increase of a size of a filter has further grown. In compliance with this demand, a heat stress generated at regeneration by a heating treatment has also increased. Consequently, to solve the above-mentioned problems, there is a strong demand for further enhancement of a resistance to heat shock of a structure. To realize this enhancement of the resistance to heat shock, a joining material layer which integrally joins a plurality of honeycomb segments is required to have further excellent stress relaxing function and joining strength.

The present invention has been developed in view of the problems of conventional technologies, and an object thereof is to provide a honeycomb structure including a joining material layer in which a stress relaxing function and a joining strength are equal to or higher than those of a joining material layer of a conventional honeycomb structure, and having an excellent resistance to heat shock.

According to the present invention, the following honeycomb structure is provided.

(1) A honeycomb structure comprising a joined honeycomb segment body in which a plurality of honeycomb segments are integrally joined by mutual joining surfaces via a joining material layer, and having a configuration in which a plurality of cells to become through channels of a fluid are arranged in parallel with one another along a central axis direction, wherein the joining material layer contains, as aggregates, inorganic particles, and acicular crystal particles having a shot content ratio smaller than 10 mass %, and the acicular crystal particles include 80 mass % or more of acicular crystal particles having an average length of 20 to 500 μm in a long axis direction of the acicular crystal particles.

(2) The honeycomb structure according to the above (1), wherein the inorganic particles for use as the aggregate in the joining material layer are inorganic particles of one, two or more selected from the group consisting of silicon carbide (SiC), cordierite, alumina, zirconia and yttria.

(3) The honeycomb structure according to the above (1) or (2), wherein an average particle diameter of the inorganic particles is from 1 to 20 μm.

(4) The honeycomb structure according to any one of the above (1) to (3), wherein the acicular crystal particles for use as the aggregate in the joining material layer are natural acicular minerals, or inorganic fibers having a shot content ratio smaller than 10 mass %.

(5) The honeycomb structure according to any one of the above (1) to (4), wherein the natural acicular minerals are acicular minerals of one, two or more selected from the group consisting of sepiolite, wollastonite, palygorskite and attapulgite.

(6) The honeycomb structure according to any one of the above (1) to (5), wherein an average diameter of cross sections of the acicular crystal particles which are perpendicular to the long axis direction of the acicular crystal particles is from 1 to 20 μm.

(7) The honeycomb structure according to any one of the above (1) to (6), wherein a ratio between the inorganic particles and the acicular crystal particles in the joining material layer is in a range of 10:90 to 90:10 in terms of mass ratio.

(8) The honeycomb structure according to any one of the above (1) to (7), wherein a Young's ratio of the joining material layer is in a range of 20 to 100 MPa.

(9) The honeycomb structure according to any one of the above (1) to (8), wherein a joining strength of the joining material layer is in a range of 500 to 1500 kPa.

A honeycomb structure of the present invention is constituted of a joined honeycomb segment body in which a plurality of honeycomb segments are integrally joined by mutual joining surfaces via a joining material layer, and this joining material contains, as aggregates, inorganic particles, and acicular crystal particles having a shot content ratio smaller than 10 mass %. Since the joining material containing the inorganic particles as well as the specific acicular crystal particles is used, it is possible to obtain the joining material layer having a suitable stress relaxing function of relaxing a heat stress due to heating in a regeneration treatment of a filter or the like, and having a joining strength which does not deteriorate. Moreover, the honeycomb structure including such a joining material layer has more excellent resistance to heat shock than a conventional honeycomb structure. That is, the honeycomb structure of the present invention includes the joining material layer in which a stress relaxing function and a joining strength are equal to or higher than those of a joining material layer of the conventional honeycomb structure, while having the excellent resistance to heat shock.

DETAILED DESCRIPTION OF THE INVENTION

Hereinafter, embodiments of the present invention will be described, but it should be understood that the present invention is not limited to the following embodiments and that modifications, improvements and the like suitably added to the following embodiments based on the ordinary knowledge of a person skilled in the art without departing from the gist of the present invention also fall in the scope of the present invention.

A honeycomb structure of the present invention includes a joined honeycomb segment body in which a plurality of honeycomb segments are integrally joined by mutual joining surfaces via a joining material layer, and has a configuration in which a plurality of cells to become through channels of a fluid are arranged in parallel with one another along a central axis direction. The joining material layer to join the plurality of honeycomb segments contains, as aggregates, inorganic particles, and acicular crystal particles having a shot content ratio smaller than 10 mass %, and the acicular crystal particles include 80 mass % or more of acicular crystal particles having an average length of 20 to 500 μm in a long axis direction of the acicular crystal particles.

Figure 1:
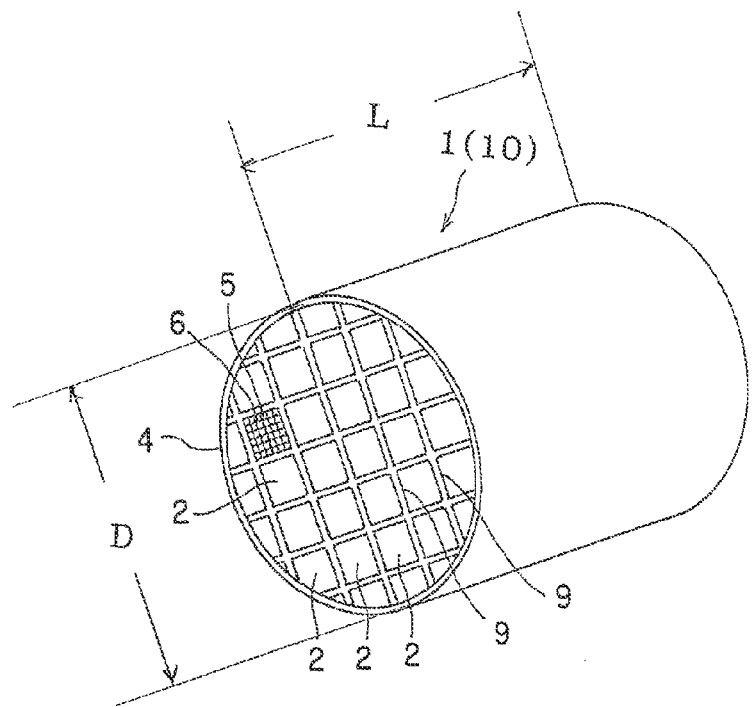
FIG. 1 is a perspective view schematically showing one embodiment of a honeycomb structure of the present invention (a cross sectional shape of the whole honeycomb structure cut along a plane perpendicular to a central axis is a circular shape)
Figure 2:
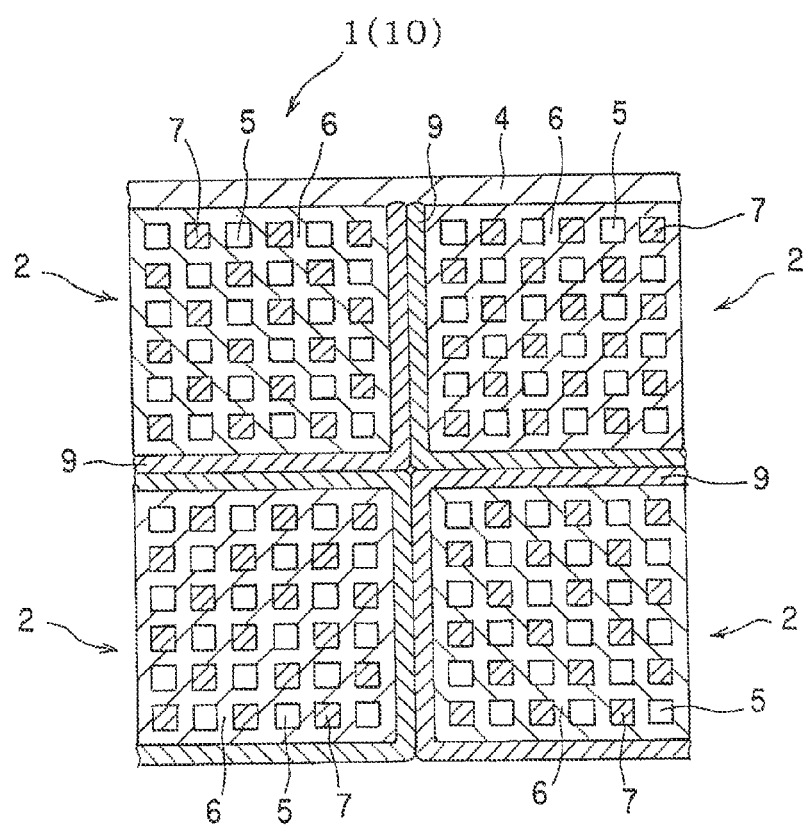
FIG. 2 is a front view of a part of another embodiment of the honeycomb structure of the present invention which is seen from an end surface side (a cross sectional shape of the whole honeycomb structure cut along the plane perpendicular to the central axis is a square shape)

First, the configuration of a honeycomb structure 1 in an embodiment of the present invention will further specifically be described with reference to the drawings. As shown in FIG. 1 and FIG. 2, the honeycomb structure 1 in the embodiment of the present invention has a configuration in which a plurality of cells 5 formed by porous partition walls 6 to become through channels of a fluid are arranged in parallel with one another along a central axis direction of the honeycomb structure 1. The configuration has a shape constituting a part of the whole structure, and the configurations are assembled in a direction perpendicular to the central axis of the honeycomb structure 1 to constitute the whole structure. Moreover, the honeycomb structure has a constitution of a joined honeycomb segment body 10 obtained by integrally joining a plurality of honeycomb segments 2 each having this shape via a joining material layer 9.

After joining the plurality of honeycomb segments 2 via the joining material layer 9, grinding treatment is carried out so that a cross sectional shape of the whole honeycomb structure cut along a plane perpendicular to the central axis of the honeycomb structure 1 is a circular shape, an elliptic shape, a triangular shape, a square shape or another shape, and an outer peripheral surface is coated with a coating material 4. When the honeycomb structure 1 is used as a DPF and this structure is disposed in an exhaust system of a diesel engine or the like, it is possible to collect particulates discharged from the diesel engine and including soot.

Figure 4:
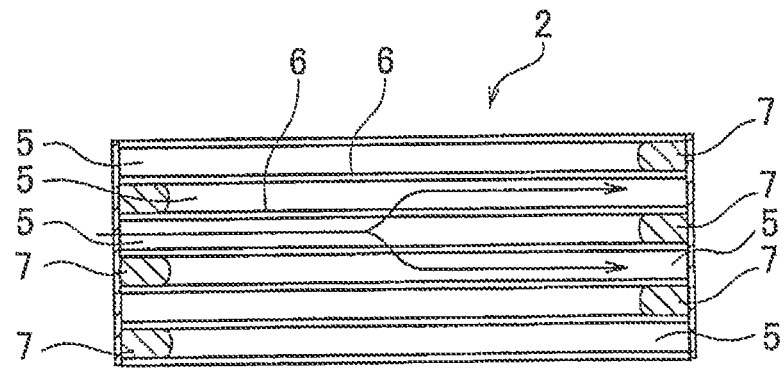
FIG. 4 is a cross sectional view taken along the A-A line of FIG. 3.

In FIG. 1, the cells 5 and the partition walls 6 are shown only in one honeycomb segment 2, but the other segments have a similar constitution. As shown in FIG. 2, each of the honeycomb segments 2 has a shape constituting a part of the whole honeycomb structure 1 (the joined honeycomb segment body 10), and also has such a shape that the honeycomb segments are assembled in the direction perpendicular to the central axis of the honeycomb structure 1 to constitute the whole structure (see FIG. 1). As shown in FIG. 4, the cells 5 are arranged in parallel with one another along the central axis direction of the honeycomb structure 1, and ends of the adjacent cells 5 are alternately plugged with a filling material 7.

Figure 3:
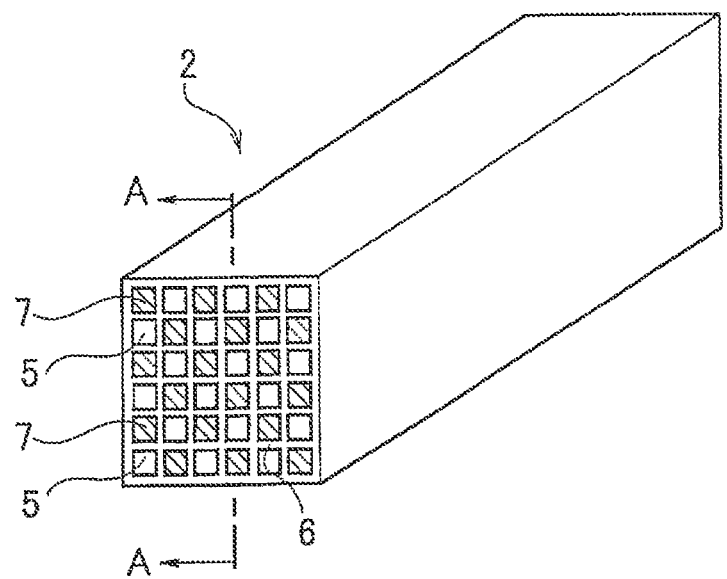
FIG. 3 is a perspective view schematically showing a honeycomb segment for use in another embodiment of the honeycomb structure of the present invention.

In the predetermined cell 5 (the inflow cell), a left end side in FIGS. 3 and 4 is open, whereas a right end side is plugged with the filling material 7, and in the other cell 5 (the outflow cell) adjacent to this predetermined cell, a left end side is plugged with the filling material 7, but a right end side is open. By such plugging, as shown in FIG. 2, end surfaces of the honeycomb segments 2 have a checkered pattern. When the honeycomb structure 1 obtained by joining the plurality of honeycomb segments 2 is disposed in the exhaust system of an exhaust gas, the exhaust gas flows into the cells 5 of each of the honeycomb segments 2 through open frontal areas on a left side in FIG. 4, to move to the right side.

FIG. 4 shows that the left side of the honeycomb segment 2 becomes an inlet of the exhaust gas. The exhaust gas flows into the honeycomb segment 2 through the cells 5 (the inflow cells) which are not plugged but are open. The exhaust gas which has flowed into the cells 5 (the inflow cells) passes through the porous partition walls 6 to flow out of the other adjacent cells 5 (the outflow cells). Moreover, when the exhaust gas passes through the partition walls 6, the particulates including the soot in the exhaust gas are collected by the partition walls 6. In this way, the exhaust gas can be purified. By such collection, the particulates including the soot are deposited in the honeycomb segment 2 with elapse of time, to increase a pressure loss. Therefore, a regeneration treatment to burn the soot and the like is carried out. It is to be noted that FIGS. 2 to 4 show the honeycomb segment 2 having the square cross sectional shape of the whole segment, but the shape may be triangular, hexagonal or the like. Furthermore, the cross sectional shape of each of the cells 5 may be a triangular shape, a hexagonal shape, a circular shape, an elliptic shape or another shape.

In the honeycomb structure 1 of the embodiment of the present invention, the plurality of honeycomb segments 2 are joined via the joining material layer 9. As shown in FIG. 2, the outer peripheral surfaces of the honeycomb segments 2 are coated with a joining material to form the joining material layer 9, and the joining material layer 9 functions so as to join the honeycomb segments 2. A joining material composition to form the joining material layer 9 contains, as aggregates, essential components including inorganic particles, and acicular crystal particles having a shot content ratio smaller than 10 mass %.

Examples of the inorganic particles for use as the aggregate of the joining material composition include silicon carbide (SiC), cordierite, alumina, zirconia, yttria, mullite, aluminum silicate, silicon, and a silicon-silicon carbide composite material. Among these components, silicon carbide, cordierite, alumina, zirconia and yttria are preferable. An average particle diameter of the inorganic particles is preferably from 1 to 20 μm, and more preferably from 1.5 to 10 μm.

Moreover, as another component for use as the aggregate, the acicular crystal particles are similarly used. "The acicular crystal particles" mentioned in the present description conceptually include both "natural acicular minerals" and "inorganic fibers having a shot content ratio smaller than 10 mass %". The acicular crystal particles for use in the present invention preferably include 80 mass % or more of acicular crystal particles having an average length of 20 to 500 μm in a long axis direction of the acicular crystal particles, and 20 mass % or less of acicular crystal particles having an average length smaller than 20 μm. The acicular crystal particles further preferably include 90 mass % or more of the acicular crystal particles having the average length of 20 to 500 μm in the long axis direction of the acicular crystal particles. Moreover, an average diameter of cross sections of the acicular crystal particles which are perpendicular to the long axis direction of the acicular crystal particles is preferably from 1 to 20 μm, and further preferably from 1.5 to 15 μm.

In the present invention, it is most preferable to use the natural acicular minerals as the acicular crystal particles for use as the aggregate. The natural acicular minerals are acicular silicate minerals produced from the nature, excluding asbestos (serpentine and amphibole). Specifically, examples of the natural acicular minerals include sepiolite, wollastonite, palygorskite and attapulgite. 80 mass % or more of the natural acicular minerals having an average length of 20 to 500 μm in a long axis direction of the natural acicular minerals are preferably contained, and an average diameter of cross sections of the natural acicular minerals which are perpendicular to the long axis direction of the natural acicular minerals is preferably from 1 to 20 μm.

Since the natural acicular minerals are used as one of the aggregates of the joining material composition, voids are generated in the joining material layer which joins the honeycomb segments, to decrease a Young's modulus of the joining material layer, thereby enabling stress relaxation by thermal expansion of the honeycomb segments. Moreover, owing to physical properties of the natural acicular minerals themselves and mutual intertwining of the acicular minerals having a fibrous elongate shape, development of cracks of the honeycomb segments can be suppressed. Therefore, these actions are correlated, to enhance a stress relaxing function and a joining strength of the honeycomb structure obtained by joining the honeycomb segments, so that the honeycomb structure having an excellent resistance to heat shock can be obtained. Such noticeable enhancement of the strength of the joining material layer of the honeycomb segments cannot be obtained, when the inorganic fibers are simply used as a conventional aggregate.

Furthermore, different from artificially produced inorganic fibers described later, these natural acicular minerals do not include a grain-like substance (hereinafter referred to as "the shot") which is a non-fiber substance because an operation of melting an inorganic material to form fibers is not carried out. Therefore, problems such as deteriorations of the stress relaxing function and joining strength caused by the presence of the shot in the case of the use of the inorganic fibers do not occur. Also in this respect, the natural acicular minerals are further preferable.

Moreover, in the present invention, it is possible to use the inorganic fibers having a shot content ratio smaller than 10 mass % in place of or in addition to the natural acicular minerals, as one of the aggregates of the joining material composition.

The inorganic fibers usually mean artificial amorphous fibers, and are obtained by blending a mineral, a mineral ore, a slag, a rock, inorganic powder and the like in various combinations, melting the blend, and carrying out blow-off by use of a centrifugal force or the like to obtain a fibrous state. Typical examples of the inorganic fibers include refractory ceramic fibers (RCF), glass wools (GW), rock wools (RW), and slag wools (SW). A residual raw material which is not spun due to thread breakage or the like during refinement of the inorganic fibers or the like solidifies again, and the grain-like non-fiber substance is generated sometimes. It is known that this grain-like substance (the shot) is the byproduct of the inorganic fibers and that when this shot is included, the stress relaxing function and joining strength of the honeycomb structure deteriorate.

Consequently, the inorganic fibers are not preferable as the component of the joining material, because the shot is included and a performance of the honeycomb structure is accordingly adversely affected. However, in the honeycomb structure of the present invention, when the shot content ratio is smaller than 10 mass %, the inorganic fibers can be used alone or together with the above-mentioned natural acicular minerals, as the acicular crystal particles which are the aggregate of the joining material composition. In the present invention, the inorganic fibers having a small shot content ratio are further preferable, the inorganic fibers having a shot content ratio smaller than 5 mass % are more preferable, and the inorganic fibers which do not contain the shot are most preferable.

In the present invention, as the aggregates of the joining material composition which forms the joining material layer 9 of the honeycomb segments 2, there are used the inorganic particles, and the acicular crystal particles having the shot content ratio smaller than 10 mass %, but a blend ratio between the inorganic particles and the acicular crystal particles is preferably in a range of 10:90 to 90:10 in terms of mass ratio. When the mass ratio of the acicular crystal particles is smaller than 10, the problems occur that the stress relaxing function and joining strength of the joining material run short and that a sufficient resistance to heat shock cannot be obtained. At the mass ratio in excess of 90, when a paste-like joining material composition is prepared, fluidity runs short, and a coating defect easily takes place. Therefore, either mass ratio is not preferable.

The joining material composition is blended with a pore former so as to make the joining material layer 9 porous, thereby enhancing the stress relaxing function. Examples of the pore former for the joining material include resin balloons, carbons, a water absorbing resin, and fly ash balloons. Among these pore formers, the resin balloons, the carbons and the water absorbing resin are preferable from the viewpoints that particle diameter fluctuation is comparatively little and that uniform pores can be formed in the joining material layer. One of these pore formers may be used alone, or two or more of the pore formers may be used.

A content ratio of the pore former for the joining material is preferably from 1 to 10 mass % of a total amount of a slurry of the joining material composition, and further preferably from 3 to 7 mass %. When the content ratio of the pore former for the joining material is in the above range, the joining material layer has a constitution in which spherical pores are further uniformly distributed. As a result, the stress relaxation is suitably compatible with the joining strength. An average particle diameter of the pore former for the joining material is preferably from 10 to 70 μm, and further preferably from 20 to 60 μm.

The joining material composition can further contain additives such as an organic binder and a dispersant. As the organic binder, heretofore known organic binders can suitably be selected and used. By this organic binder, it is possible to obtain the joining material layer having a joining strength equal to that of a joining material layer of a conventional honeycomb structure. As the dispersant, heretofore known dispersants can suitably be selected and used.

As the organic binder, specifically, carboxymethylcellulose (CMC), methylcellulose, hydroxypropyl methylcellulose or the like can be used. Among these organic binders, carboxymethylcellulose and methylcellulose are preferable. This is because joining properties of the joining material composition become suitable. An amount of the organic binder to be blended is preferably from 1 to 10 parts by mass, and further preferably from 3 to 6 parts by mass to 100 parts by mass of the aggregates. When the amount is in the above range, it is possible to form the joining material layer having a suitable joining strength.

The coating of the joining surfaces of the honeycomb segments 2 with the joining material may be performed on the outer peripheral surfaces of the adjacent honeycomb segments, but the coating may be performed only to one of the corresponding outer peripheral surfaces between the adjacent honeycomb segments. This coating of the only one of the corresponding surfaces can preferably save an amount of the joining material to be used. A thickness of the joining material layer is determined in consideration of a joining force between the honeycomb segments, and is suitably selected from a range of, for example, 0.5 to 3.0 mm.

From the viewpoints of strength and heat resistance, an example of a material of the honeycomb segments 2 for use in the present invention is a material constituted of at least one selected from the group consisting of silicon carbide (SiC), a silicon-silicon carbide composite material formed by using silicon carbide (SiC) as an aggregate and using silicon (Si) as a binding agent, silicon nitride, cordierite, mullite, alumina, spinel, a silicon carbide-cordierite composite material, a silicon-silicon carbide composite material, lithium aluminum silicate, aluminum titanate, and Fe—Cr—Al metal. Above all, the material constituted of silicon carbide (SiC) or the silicon-silicon carbide composite material is preferable.

Preparation of the honeycomb segment 2 can be performed, for example, by adding a binder such as methylcellulose, hydroxypropoxyl cellulose, hydroxyethylcellulose, carboxymethylcellulose or polyvinyl alcohol, a surfactant, water as a solvent and the like to the material suitably selected from the above-mentioned materials, to obtain a kneaded material having plasticity, extruding this kneaded material into the above-mentioned shape, and then drying the segment with microwaves, hot air or the like, followed by sintering.

As the filling material 7 for use in plugging the cells 5, a material similar to that of the honeycomb segment 2 can be used. The plugging with the filling material 7 can be performed by immersing the end surface of the honeycomb segment 2 into the slurry-like filling material 7 to fill the filling material into the open cells 5 while the cells 5 which are not to be plugged are masked. The filling of the filling material 7 may be performed prior to firing after the forming of the honeycomb segment 2, or after the firing. However, the filling is preferably performed prior to the firing, because the firing step ends for single step.

The honeycomb structure of the present invention has the above constitution, and a compressive Young's modulus of the joining material layer 9 in a Z-axis direction of the layer is from 20 to 100 MPa, and preferably from 30 to 60 MPa.

Additionally, the compressive Young's modulus in the Z-axis direction was calculated as follows. That is, a sample having a predetermined dimension (from 10×10 mm to 30×30 mm, and a thickness of 0.5 to 3 mm) was cut out, and subjected to a compression test in the Z-axis direction. Moreover, the sample may be provided with a base material. The compressive Young's modulus in the Z-axis direction was calculated in accordance with the following equation by use of, as a Young's modulus, a tilt in a stress-strain curve at a time when a load of 0 to 3 MPa was applied to the sample.

$$E = \frac{W}{S} \times \frac{t}{\Delta t} \qquad \text{[Equation 1]}$$

E: the Young's modulus (MPa),
W: the load (N),
S: a sample area (mm$^2$),
t: a sample thickness (mm), and
Δt: an amount (mm) of a change of the sample thickness.

When the compressive Young's modulus of the joining material layer for use in the present embodiment in the Z-axis direction is smaller than 20 MPa and the segment has a temperature distribution in itself, the segment itself is noticeably deformed, and cracks are generated sometimes. On the other hand, when the compressive Young's modulus is larger than 100 MPa, the segment itself does not have any problems. However, in the honeycomb structure in which the plurality of honeycomb segments are integrally joined via the joining material layer, the stress cannot be relaxed, and an outer peripheral portion of the honeycomb structure is damaged sometimes due to heat stress rapidly generated during the regeneration treatment of the DPF.

Moreover, in the honeycomb structure of the present invention, the joining strength in the joining material layer 9 of the honeycomb structure is from 500 to 1500 kPa, and preferably from 800 to 1200 kPa.

The joining strength in the joining material layer 9 was measured by the following method. That is, a two-segment structure in which two honeycomb segments were joined was cut out from the honeycomb structure, and the joining strength was calculated in accordance with the following equation by use of a breakdown load and an area of a joining portion at a time when a shear load was applied to the joining portion of the two-segment structure in a Y-axis direction (the longitudinal direction) of the joining portion.

$$\sigma = \frac{W}{S} \times 1000 \qquad \text{[Equation 2]}$$

σ: the joining strength (kPa),
W: the breakdown load (N), and
S: the area of the joining portion (mm$^2$).

EXAMPLES

Hereinafter, the present invention will further specifically be described with respect to examples, but the present invention does not undergo any limitation by these examples.

Examples 1 to 6 and Comparative Examples 1 and 2

1. Preparation of Honeycomb Segment

As a honeycomb segment raw material, SiC powder and metal Si powder were mixed at a mass ratio of 80:20, starch and resin balloons were added as pore formers to this mixture, and methylcellulose and hydroxypropoxyl methylcellulose, a surfactant and water were further added to prepare a kneaded material having plasticity. This kneaded material was extruded, and dried with microwaves and hot air, to obtain a formed honeycomb segment body having a partition wall thickness of 310 μm, a cell density of about 46.5 cells/cm$^2$ (300 cells/square inch), a regular tetragonal cross section with one side of 35 mm and a length of 152 mm. In this formed honeycomb segment body, both end surfaces of cells were plugged so that the end surfaces had a checkered pattern. That is, the plugging was performed so that mutually opposite ends of the adjacent cells were closed. As a plugging material, a material similar to the honeycomb segment raw material was used. Both the end surfaces of the cells were plugged, dried, degreased at about 400° C. in the atmospheric air, and then fired at about 1450° C. in an Ar inactive atmosphere, to obtain the honeycomb segment including SiC crystal particles bound with Si and having a porous structure.

2. Preparation of Joining Material

As aggregate components, inorganic particles of inorganic microparticle silicon carbide and acicular crystal particles of wollastonite were used, and as a pore former, resin balloons were used. The wollastonite of the acicular crystal particles was used in which an average length in a long axis direction of the particles and an average diameter of cross sections perpendicular to the long axis direction were variously changed. Moreover, a blend ratio between the inorganic microparticle silicon carbide and the wollastonite was variously changed. This wollastonite was a natural mineral and had a shot content ratio of zero. Furthermore, colloidal silica as an inorganic binder, carboxymethylcellulose as an organic binder and polyethylene glycol oleate as a dispersant were added, and water was further added and mixed. Afterward, this mixture was kneaded in a mixer for 30 minutes to obtain a paste-like joining material composition. Then, water was added to regulate a viscosity of the paste-like joining material composition so that the viscosity was from 300 to 400 dPa·s. Sizes and a blend ratio of the inorganic microparticle silicon carbide and the wollastonite used here and a blend ratio and the like of the other added components are shown in Table 1.

3. Preparation of Honeycomb Structure

An outer wall surface of the honeycomb segment was coated with various joining material compositions shown in Table 1 to form a joining material layer having a thickness of about 1 mm, and another honeycomb segment was mounted on the joining material layer. This step was repeated to prepare a laminated honeycomb segment body constituted of 16 honeycomb segments, and an external pressure was added, to join all the honeycomb segments. Afterward, the laminated honeycomb segment body was dried at 140° C. for two hours to obtain a joined honeycomb segment body. Next, an outer periphery of the joined honeycomb segment body was cut into a cylindrical shape, coated with a coating material, and dried at 700° C. for two hours to harden, thereby obtaining the honeycomb structure.

4. Evaluation Test

A part of each of the obtained honeycomb structures was cut and removed, and a compressive Young's modulus in a Z-axis direction and a joining strength of each of samples were measured. Furthermore, the respective honeycomb structures were subjected to a rapid heating test (the burner spalling test, B-sp), a rapid cooling test (the electric furnace spalling test, E-sp), and an engine test (the E/G test). These test results are shown in Table 2.

The compressive Young's modulus and the joining strength were measured by the methods already described in the present description. Moreover, the rapid heating test (B-sp), the rapid cooling test (E-sp) and the engine test (the E/G test) were carried out as follows, respectively.

"B-sp" Test (Burner Spalling Test, Rapid Heating Test):

This was a test in which air heated by a burner was allowed to flow through the honeycomb structure, thereby making a temperature difference between the center and an outer portion, and a resistance to heat shock was evaluated at a temperature at which any cracks were not generated in the honeycomb structure. The higher the heatable temperature was, the higher the resistance to heat shock became.

"E-sp" Test (Electric Furnace Spalling Test, Rapid Cooling Test):

This was a test in which the honeycomb structure was heated by an electric furnace at 500° C. for two hours to make a uniform temperature. Afterward, the honeycomb structure was removed from the electric furnace, and rapidly cooled down to room temperature. The resistance to heat shock was evaluated by judging whether or not the cracks of the honeycomb structure due to the rapid cooling were present.

"E/G" Test (Engine Test at 1000° C.):

This was a test in which particulates deposited for the regeneration of the filter were burnt, and on conditions that the temperature of the honeycomb center was 1000° C., the resistance to heat shock was evaluated by judging whether or not the cracks of the honeycomb structure were present.

TABLE 1

| | Acicular crystal particles | | Shot | | | | |
|---|---|---|---|---|---|---|---|
| | Ave. length (μm) | Ave. dia. (μm) | content ratio (mass %) | Blend ratio* (mass %) | Organic binder (mass %) | Inorganic binder (mass %) | Pore former (mass %) |
| Example 1 | 200 | 3.0 | 0 | 54.1 | 0.3 | 1.0 | 6.0 |
| Example 2 | 150 | 6.0 | 0 | 28.3 | 0.8 | 0.8 | 4.0 |
| Example 3 | 100 | 15.0 | 0 | 28.3 | 0.6 | 0.8 | 2.0 |
| Example 4 | 200 | 10.0 | 0 | 77.4 | 0.6 | 0.6 | 4.0 |
| Example 5 | 300 | 0.6 | 0 | 30.6 | 0.4 | 1.0 | 1.0 |
| Example 6 | 200 | 25.0 | 0 | 50.4 | 0.3 | 1.0 | 2.0 |
| Comparative Example 1 | 300 | 5.0 | 50 | 46.4 | 0.3 | 1.0 | 2.0 |
| Comparative Example 2 | 10 | 3.0 | 0 | 29.2 | 0.4 | 1.0 | 2.0 |

*The blend ratio of the acicular crystal particles of the aggregate component is shown.

TABLE 2

| | Young's modulus (MPa) | Joining strength (kPa) | B-sp test (° C.) | E-sp test | E/G test |
|---|---|---|---|---|---|
| Example 1 | 46 | 874 | 800 | good | good |
| Example 2 | 42 | 762 | 900 | good | good |
| Example 3 | 51 | 656 | 1000 | good | good |
| Example 4 | 30 | 792 | 900 | good | good |
| Example 5 | 73 | 1380 | 900 | good | good |
| Example 6 | 25 | 555 | 800 | good | good |
| Comparative Example 1 | 40 | 493 | 800 | bad | good |
| Comparative Example 2 | 110 | 1083 | 600 | bad | bad |

In Table 2, "good" means that any cracks were not generated, and "bad" means that the cracks were generated. As seen from the results of Table 2, the honeycomb structures of the examples of the present invention withstood a high temperature which was not lower than 800° C., and had a suitable resistance to heat shock. Moreover, in these honeycomb structures, any cracks were not generated in the E-sp test and the E/G test, and the honeycomb structures had the suitable resistance to heat shock. In particular, the honeycomb structures of Examples 1 to 5 had a further excellent resistance to heat shock. On the other hand, the honeycomb structure of Comparative Example 1 had a very large shot content ratio of 50 mass %, the cracks were generated in the honeycomb structure in the E-sp test, and hence the honeycomb structure had a poor resistance to heat shock. Moreover, in the honeycomb structure of Comparative Example 2, wollastonite of acicular crystal particles had a very small average length of 10 μm in a long axis direction. Therefore, a sufficient stress relaxing function was not obtained, a low temperature of 600° C. resulted in the B-sp test, the cracks were generated in the honeycomb structure in the E-sp test and the E/G test, and the honeycomb structure had a poor resistance to heat shock.

A honeycomb structure of the present invention is useful as a collecting filter of particulates, for example, a diesel particulate filter (DPF) to collect and remove the particulates included in an exhaust gas from a diesel engine or the like.

DESCRIPTION OF REFERENCE MARKS

1: honeycomb structure,
2: honeycomb segment,
4: coating material,
5: cell,
6: partition wall,
7: filling material,
9: joining material layer, and
10: joined honeycomb segment body.

What is claimed is:

1. A honeycomb structure comprising a joined honeycomb segment body in which a plurality of honeycomb segments are integrally joined by mutual joining surfaces via a joining material layer, and having a configuration in which a plurality of cells to become through channels of a fluid are arranged in parallel with one another along a central axis direction,
wherein the joining material layer contains, as aggregates, inorganic particles, and natural acicular minerals, and the natural acicular minerals include 80 mass % or more of natural acicular minerals having an average length of 20 to 500 μm in a long axis direction of the natural acicular minerals,
wherein the Young's modulus of the joining material layer is in a range of 20 to 100 MPa.

2. The honeycomb structure according to claim 1, wherein the inorganic particles for use as the aggregate in the joining material layer are inorganic particles of one, two or more selected from the group consisting of silicon carbide (SiC), cordierite, alumina, zirconia and yttria.

3. The honeycomb structure according to claim 1, wherein an average particle diameter of the inorganic particles is from 1 to 20 μm.

4. The honeycomb structure according to claim 2, wherein an average particle diameter of the inorganic particles is from 1 to 20 μm.

5. The honeycomb structure according to claim 1, wherein the natural acicular minerals are acicular minerals of one, two or more selected from the group consisting of sepiolite, wollastonite, palygorskite and attapulgite.

6. The honeycomb structure according to claim 4, wherein the natural acicular minerals are acicular minerals of one, two or more selected from the group consisting of sepiolite, wollastonite, palygorskite and attapulgite.

7. The honeycomb structure according to claim 1, wherein an average diameter of cross sections of the natural acicular minerals which are perpendicular to the long axis direction of the natural acicular minerals is from 1 to 20 μm.

8. The honeycomb structure according to claim 6, wherein an average diameter of cross sections of the natural acicular minerals which are perpendicular to the long axis direction of the acicular crystal particles is from 1 to 20 μm.

9. The honeycomb structure according to claim 1, wherein a ratio between the inorganic particles and the natural acicular minerals in the joining material layer is in a range of 10:90 to 90:10 in terms of mass ratio.

10. The honeycomb structure according to claim 8, wherein a ratio between the inorganic particles and the natural acicular minerals in the joining material layer is in a range of 10:90 to 90:10 in terms of mass ratio.

11. The honeycomb structure according to claim 1, wherein a joining strength of the joining material layer is in a range of 500 to 1500 kPa.

* * * * *